United States Patent [19]

Rasmussen

[11] Patent Number: 4,908,253

[45] Date of Patent: Mar. 13, 1990

[54] HIGH STRENGTH LAMINATE WITH BARRIER LAYER

[76] Inventor: Ole-Bendt Rasmussen, Forchwaldstrasse 23, CH-6318 Walchwil/Zug, Switzerland

[21] Appl. No.: 351,298

[22] Filed: May 11, 1989

Related U.S. Application Data

[60] Continuation of Ser. No. 224,707, Jul. 27, 1988, abandoned, which is a continuation of Ser. No. 627,501, Jul. 9, 1984, Pat. No. 4,793,885, which is a continuation of Ser. No. 455,045, Jan. 3, 1983, abandoned, which is a continuation of Ser. No. 600, Jan. 2, 1979, abandoned, which is a continuation of Ser. No. 803,895, Jun. 6, 1977, abandoned, which is a division of Ser. No. 592,273, Jul. 1, 1975, Pat. No. 4,039,364.

[30] Foreign Application Priority Data

Dec. 11, 1974 [GB] United Kingdom .................... 53644
Feb. 12, 1975 [GB] United Kingdom .................... 5972

[51] Int. Cl.$^4$ ............................................. B32B 3/28
[52] U.S. Cl. ..................................... 428/114; 428/141; 428/500; 428/910
[58] Field of Search ..................... 428/141, 500, 910

[56] References Cited

U.S. PATENT DOCUMENTS

| | | | |
|---|---|---|---|
| 4,039,364 | 8/1977 | Rasmussen | 156/224.25 |
| 4,407,877 | 10/1983 | Rasmussen | 428/105 |
| 4,629,525 | 12/1986 | Rasmussen | 156/244.24 |

FOREIGN PATENT DOCUMENTS

1526722  1/1978  United Kingdom .

Primary Examiner—Edith Buffalow
Attorney, Agent, or Firm—William J. Daniel

[57] ABSTRACT

A high-strength laminate comprising generally weakly adhered biaxially oriented films, each formed of a blend which exhibits a distinct fibrous morphology with the fibres forming a distinct unidirectional grain when measured on a macro-scale but with the fibre-portions strongly deflected from this direction as seen on a micro-scale and with the unidirectional grain in at least two of the films criss-crossing each other. Producing this laminate by melt attenuating the blend(s) while extruding the latter to films, cross-laminating the layers before or after solidification while they are still in molecularly unoriented state—except for the weak orientation produced by the melt-attenuation—and finally strongly biaxially orienting the laminate by stretching in several steps, whereby the stretching is generally uniaxial during each step.

2 Claims, 7 Drawing Sheets

HIGH STRENGTH LAMINATE WITH BARRIER LAYER

This application is a continuation of U.S. patent application Ser. No. 224,707, filed Jul. 27, 1988, now abandoned, which is a continuation of application Ser. No. 455,045, filed Jan. 3, 1983, now abandoned, which was a continuation of Ser. No. 000,600, filed Jan. 2, 1979, now abandoned, which was a continuation of Ser. No. 803,895, filed Jun. 6, 1977, now abandoned, which was in turn a division of Ser. No. 592,273, filed Jul. 1, 1975, now issued as U.S. Pat. No. 4,039,364 on Aug. 2, 1977.

The present invention relates to a method of manufacturing a laminated strength sheet. Cross-laminates of uniaxially oriented films from crystalline polymers are known to exhibit a generally highly advantageous combination of different strength properties of which the most surprising has been the tear propagation strength (of U.S. Pat. No. 3,322,613) especially when a relatively poor bonding is effectuated between the layers. During the tearing from an incision, the layers will then delaminate around the notch while they split or flow in different directions—the tear "forks"—whereby the notch effect is smoothed out. Sheets of this kind are particularly useful for various heavy duty applications such as tarpaulin substitutes, cover sheets, heavy duty bags, and heavy duty wrapping film.

The most expedient method of producing a sheet of the above kind is described in British patent specification No. 816607, and consists in strongly orienting the molecules of a tubular film in its longitudinal direction, helically cutting and unfolding it to a flat film with the orientation at bias (e.g. 45° C.), and subsequently continuously laminating this film with a similarily produced flat film, while the respective directions of orientation are arranged in criss-crossing relationship.

It is known that, for a given thickness, the tear propagation resistance is pronouncedly increased by use of 3 layers with 3 different directions of orientation, e.g. obtained by laminating 1 longitudinally oriented film with 2 films which are oriented at bias as described above.

One drawback of the process described above (and the resultant product) is that it is practically impossible to produce really thin film, whereby the economical advantage of the strength per weight is limited. It has proven that the technical-economical lower limit connected with the carrying cut of the spiral-cutting and the laminating processes is, generally speaking, about 30 gr per sq.m. Thus for a 2-layers laminate, the lower limit is about 60 gr per sq.m while for a 3-layers laminate—which as mentioned above is necessary for proper utilization of the tear-stopping effects—it is about 90 gr per sq.m.

A second draw-back is the practical limitations in width caused by the rotation of heavy machine-parts and bobbins in connection with the spiral cutting. As a very general statement, it can be said that the width is hereby limited to ab 1½-2 m.

A third draw-back relates to certain energy-absorption values for the cross-laminates so produced. Relatively low energy-absorption has been found with regard to high-speed tearing (Elmendorf tear test) and for low and high speed tensile testing (TEA strength and Elmendorf impact strength). In this connection it appears that the very anisotropic character of the layers is disadvantageous. If for instance a 2-ply cross-laminate of this kind is drawn parallel to the direction of of orientation in one of the layers, then the yieldpoint and the elongation at break are in essence determined by the said layer.

My earlier work to overcome the abovementioned drawbacks, and to provide for a cheaper production process for a product with similar or analogous properties, is described in British patent specification No. 1261 397. In said specification a process is disclosed which produces a criss-crossing structure through a die with rotating parts, while forming in the same die a soft and weaker middle zone by coextrusion. The method consists in coextrusion several concentrical or almost concentrical layers of crystallene polymer alternating with layers of a softer polymer, and dividing said layers inside the die by means of teeth arranged in rows and fixed to the cylindrical die walls pointing from the concave wall surface inwardly, and from the convex wall surface outwardly. The die-parts are rotated in opposite directions and thereby the layers are divided according to lefthand helices near one and right-hand helices near the other sheet surface. It is specified that the combing can either be carried through to the middle of the film or be limited to portions near the surfaces. The coextrusion of polymers before the combing zone is adapted to provide for a soft and weak middle-zone.

The film extruded by this method consists, in all essence, of unoriented material. However, the systems of alternating stiff layers of a "first polymer" and soft layers of a "second polymer" divided to filaments or the like in a lineary pattern by the teeth, produces in each half-part of the sheet a tendency to split or flow in one direction, and since the lineary patterns at the two surfaces criss-cross each other and a tendency to deleminate is provided, there is obtained a tear-stopping effect which is analogous to the "forking" effect in a true cross-laminate.

The above specification further proposes to biaxially stretch the so produced laminate under such conditions that instead of yielding biaxially oriented layers, the molecular orientation will become generally uniaxial in each layer, with the direction of orientation in different layer criss-crossing each other. In order to obtain such uniaxial orientation, the second material must be very prone to yield, e.g. because it is still molten or semimolten while the first material is solid, and the filaments of the first material must be kept straightened out by biaxial strain.

Although the above method would on principle solve the problems of obtaining a lower thickness and higher width in cross laminates there were found some essential difficulties during the later technical developments. It was confirmed that the extrusion method was commercially feasible for manufacture of unoriented film with high tear propagation strength, but with a low impact strength due to the lack of orientation. However, essential drawbacks were found in connection with a subsequent biaxial stretching. As also indicated in the above specification, one must use a relatively great number of rows of the teeth in the extrusion die in order to obtain the fibre finess which is necessary for the stretching system.

This, however, made the maintenance of the die difficult and caused frequent "hang-up" of polymer lumps between the teeth. Further, the interaction between the teeth in one half-part of the die and those in the other half-part made it necessary either to use excessive amounts of soft middle layer material, or to limit the combing to two relatively thin surface zones of the sheet. Further, it was very difficult to establish and maintain the biaxial stretching conditions necessary for obtaining a generally uniaxial molecular orientation as described.

The present invention is based on the discovery, than even a strongly biaxially oriented film, with the same orientation in two directions perpendicularly to each other, can exhibit a pronounced direction of splitability, provided the film is extruded from a blend and is melt-attenuated in connection with the extrusion. Due to the attenuation there is formed a unidirectional fibrous morphology which can be observed in an ordinary microscope. There is also produced a uniaxial orientation by the melt attenuation, but this orientation is generally very weak. When the film (which can e.g. consists of about 50% polypropylene and 50% polyethylene) is drawn at an angle to the grain direction, e.g. perpendicularly hereto, then the fibre portions, as seen on a micro-scale, will deflect and branch out, but it is still possible to follow the zig-zagging path of the grain from branch-point to branch-point, and when following different paths in this manner it will be found that, on a macro-scale there is still a undirectional grain. This micro-structure is very different from the filament structure described in the above British patent specification No. 1261 397.

After a certain elongation, e.g. about 40% perpendicularly to the grain, examination of the film is polarized light (or more exactly by x-ray diffraction) shows that the orientation is equal in all directions. After further drawing in the same direction, there is still a pronounced splitability along the grain direction, till at a certain point, e.g. about 80% total elongation, the splitability is equal in all directions. On further drawings, the main direction of splitability will coincide with the main direction of orientation. The film can e.g. be elongated 100% in this direction, and thereafter drawn in the original grain direction till the point where it has equal orientation in all directions. At this point there is again a marked splitability in the original grain direction, and by microscopical examination it will be possible, although difficult, to follow the zig-zagging course of the grain and see that on a macro-scale, the grain direction still in essence coincides with the direction of splitability.

Following this discovery, the method according to the present invention is characterized by comprising the steps of attenuating while extruding each of at least two layers of at least one molten polymer blend to impart to the polymer a unidirectional grain with a pronounced direction of splitablity when solidified, before or after solidification of said layers uniting the layers into a common sheet with the grain direction or adjacent layers herein extending in criss-crossing relationship, while forming a generally weak bond, between said layers solidifying if not already solid, and finally biaxially orienting the solid laminated sheet thus obtained in several steps which each are generally substantially uniaxial at a temperature sufficiently low for maintaining a significant splitability in each layer.

The product produced hereby is a high-strength laminate comprising generally weakly adhered biaxially oriented films, each formed of a blend which exhibits a distinct fibrous morphology with the fibres forming a distinct unidirectional grain when measured on a macro-scale but with the fibre-portions strongly deflected from this direction as seen on a micro-scale and with the said undirectional grain in at least two of the films criss-crossing each other.

It has been found that the structure so formed is particularly suitable for almost any high-strength application where energy absorption is essential, no matter whether this is energy absorption during tear propagation, puncturing, or impact. The splitability of the layers in connection with the weak bonding between the layers produces a "forking effect" similar to that in cross-laminates of uniaxially oriented film, but the energy absorption during fast tearing (Elmendorff tear test) is essentially higher. Further, most impact properties, in particular Elmendorff impact strength, are improved, and so will usually be the energi-absorption during fast puncturing (Beach-strength). These improvements are considered to be a result partly of the biaxial character of the orientation in each layer, and partly of the distinct fibrous morphology. The biaxial orientation further has the advantage that the laminate according to the invention has shrinkfilm properties, which cross-laminates of uniaxially oriented films do not have.

It has been mentioned above that the process for producing cross-lamination of uniaxially oriented films, under practical conditions gives a rather high limit for sheet thickness (about 90 gr per sq.m for a 3-ply) and a rather low limit for sheet width. In both respects the present method is greatly advantageous due to the fact that the sheet is strongly stretched in two or more directions after the lamination. Thus, it is technically and economically feasible to obtain about 10 gr per sq.m weight for each of the films in the laminate, i.e. about 30 gr per sq.m for a 3-ply laminate. This greatly widens the field of uses.

While blends of very compatible polymers, e.g. different polyamides, will usually not form a grain as described, blends of semicopatible or incompatible coextrudable thermoplastic polymers will always do so, provided the contents of one polymer is not too predominant. To be on the safe side, there should not be more than 85% of any polymer in the blend. If the polymers are really incompatible, there should preferably be added an "alloying agent".

The best properties will be obtained if the grain is formed of crystal threads "cemented" together by small amounts of a surrounding elastomer. By small amounts is meant ab 5–20% of the total.

In order to keep the contents of elastomer low and still obtain a distinct fibrous morphology with the elastomer tending to surround the other material the elastomer is preferably used as "alloying agent" for two other polymers. Thus a preferable composition is two crystalline incompatible polyolefins—e.g. iso- or syndiotactic polypropylene and high- or low density polyethylene—with addition of a sticky polymer which bonds to both—e.g. atactic polypropylene, ethylene-propylene-rubber (preferably a sticky type with relatively high contents of propylene), and polyisobutylene of a molweight as commonly used for pressure-sensitive adhesives.

The attenuation, by which the uniaxial grain is formed, can be carried out in different ways. It can e.g. be by gradual reduction of the spacing of the exit chamber in the extrusion die, or by passage of the molten material between a row of closely spaced partitions or the like in the die, or by stretching in molten state after the exit of the die, or by combinations of such steps.

The direction of splitability and the splitability in the layers is determined by measuring the tear propagation resistance by the tongue tear method in different directions. The direction of splitability is understood as the direction which exhibits the lowest tear propagation strength, while the splitability is understood as the ratio between the highest tear propagation resistance and the lowest tear propagation resistance. The splitability in the layers after the biaxial orientation should preferably be bigger than 2:1, however 1.5:1 can be tolerated.

In order to allow a local delamination during tearing, and thereby make the tear "fork", it is essential to form a generally weak bond in the lamination of the layers. If the bond formed is an even bond, and the thickness of each layer is 20 gr per sq.m, a peel strength between about 5 gr per cm and 500 gr per sq.m is generally suitable. Since there is a "competition" between rupturing forces and delaminating forces during tearing, the upper limit depends on the layer thickness and is generally proportional to the latter.

As it will appear from the description of various embodiments, there exist different means to establish and control the strength of the bonding, of which the most practical involve at some step a coextrusion of a special layer of adhesive component or "release component".

As regards the biaxial orientation, it has been found essential to carry it out in several steps which each are generally substantially uniaxial. It was hereby found that simultaneous stretching in two directions destroyed the grain so that no "forking effect" was achieved. There is also a tendency to destroy the grain by stretching near the melting point of the major components of the sheet. I believe that recrystallization and other physical phase-rearrangement phenomona play a role in this connection. In any case the best properties have been found by stretching below the recrystallization temperature which e.g. for polypropylene is about 70°–80° C., and even lower temperatures are preferable. For stretching at such low temperatures special stretching methods are necessary which will be delt with later in this specification.

Preferably the biaxial orientation produced by the stretching below the melting point should in any direction have a component at least equal to the orientation produced by the melt-attenuation, and generally it is preferable to make the said biaxial orientation much stronger. Degree of orientation should in this connection be measured by x-ray defraction, but for quick and approximate examination of relative values, observations of interference colors between crossed polaroid filters are also suitable.

As explained above it is essential that the bonding between the grainy layers is generally weak, in order to enable a local delamination to take place during tear propagation. This, however, does not necessarily mean that the bonding must be weak all over the surface, but on the contrary great advantage for tear strength is generally achieved when employing the embodiment described in claim 2. Hereby, the necessary local delamination is easily started, but is thereafter stopped or will proceed under great resistance. At the same time the strongly bonded portions prevent a delamination of the laminate in or adjacent to a glued or welded seam under tension, which otherwise can easily occur.

By a suitable choice of the bonding pattern, the different bonding strengths, and the type of rupture in the weak-bond or no-bond areas—whether brittle or more fluid-the tearing properties can be "taylor-made" for different purposes.

The method in claim 2 is particularly useful in connection with relatively thin layers. It has already been mentioned that there is a "competition" between rupturing and delamination forces during tear propagation, which means that easier start of delamination is required the thinner the layers are. As a practical rule, it will almost always be advicable to apply the method of claim 2 if the layers are thinner than ab. 40–50 gr per sq.m.

The use of strong-bond/weak-bond or strong-bond/no-bond patterns are in fact well-known in connection with cross-laminates of films which are uniaxially oriented or are biaxially oriented in a very unbalanced manner, of, the specifications of U.S. Pat. Nos. 3,496,056 and 3,342,657 and British Pat. No. 1316640 and Danish Pat. No. 119733. However, the layers of such known laminates, when tested individually, exhibit extremely low impact and puncture resistance (except in case of special and expensive polymers such as e.g. nylon 6), whereas it has been found that the individual layers according to the present invention exhibit pronouncedly and surprisingly higher impact and puncture resistance. Therefore, a weaker adhesion (or no adhesion) in the relevant areas and/or a larger extension of these areas is allowable without any significant loss of impact or puncture strength.

A preferred way of forming or improving the effect of the generally weak bond between adjacent layers is described in claim 3.

By release substance is here meant a substance, preferably a polymer material, with either a low cohesive strength in itself or with a low adhesion to the adjacent polymer layer.

Whether a release or an adhesive substance is to be chosen depends on whether and to what extent the polymer blends are compatible with each other and of the uniting method, e.g. the temperature used during lamination.

In any case, by means of the method according to claim 3, it is possible to better control the magnitude of the bonding force.

A prefered way of effectuating the bond is described in claim 4 whereby one obtains the advantage that during tearing, the free or weakly bonded parts of the midlayer will elongate because of the stretching forces applied, and will absorbe some energy thus further stopping the notch effect.

Although there are several operational advantages by uniting the layers inside an extrusion die, as will be described later with reference to claim 22, the embodiment according to claim 5 is preferable with respect to the properties obtained, since it enables the formation of the most pronounced uniaxial grain in each layer.

An embodiment of the method according to claim 5 is described in claim 6, where the solid, preproduced film may be placed around a mandrel that extends through the centre of the extrusion die. The solid film can be forewarded along the mandrel and when passing the exit slot of the extrusion die, catching and forewarding and thus attenuating the rotated, still fluid polymer which in that way is wound around the solid film forming an outer film with a helically running grain.

As already mentioned, the tear propagation strength for a given total thickness is significantly better in a 3-layered laminate than in a 2-layered laminate. Therefore it is also preferable to extrude two or more films successively out of two or more mutually contrarotating extension slots onto the same solid film in the manner mentioned above.

Further advantages of the methods according to claim 6 are the possibility of producing fully uniaxially grain during the individual oblique haul-off, the possibility of chockcooling the polymer on the mandrel, thereby achieving a finer grain and less tendency to age by recrystallization, as well as higher working speed, and the possibility of allowing the use of more difficult polymers, e.g. polymers of particular high molecular weight because of the supporting and conveying effect of the film on the mandrel, which can be very close to the circular exit slot.

In the above description, the rotating fluid tubular layer is drawn inwardly from the rotating extrusion die to the solid conveying film. This feature will generally be advantageous because the elastic tensions produced by the rotation tend to reduce the diameter of the tubular fluid film, thus promoting the catching of the fluid film of, and its sticking to the forwarded, solid film.

However, it is also within the scope of claim 6 to arrange the solid, foreward film in a generally tubular shape with a diameter greater than that of the rotating exit slot, and by blowing or by other means extrude the fluid, rotating, tubular film outwardly unto the solid film.

It should be mentioned, that the rotating part may be the forwarded, solid film while the extrusion die is fixed.

It should be noted, that by "machine direction" is here ment the forewarding direction of the solid preproduced film.

A preferred embodiment of the method according to the invention is described in claim 7. The advantage of this embodiment is in the first place, that the different process steps, viz. extrusion, attenuating, uniting with the grain of adjacent layers in criss-crossing relationship and biaxial stretching, can be carried out in line. Preferably the sheet consists of three layers with the grain of the midlayer extending longitudinally as will be further described later in connection with the description of the drawings.

Compared to the embodiment in claim 6, the embodiment in claim 7 has the operational advantage that all layers are extruded from the same die, but this is achieved at the expense of the conveying effect.

By solidifying each grainy layer before they are united to a common sheet as described in claim 8 simpler or more conventional equipment can be used. A preferred embodiment of this method according to claim 8 is to produce the sheet as described in claim 9 with particularly cheap and simple machinery (at the expense of the advantages connected with an air in-line operation).

Another preferred embodiment of the method according to claim 8 is to produce the sheet as described in claim 10. This will give the possibility of producing rather wide layers. The lateral tentering can be carried out by means of a tenter frame preferably in an oven with circulating air which is kept at a temperature slightly above the melting point.

In order to simplify the lamination of separately extruded and solidified films, and thereby also make lamination of thinner film possible at least the first phase of the uniting process may be combined with at least the first phase of the lateral stretching process as said in claim 11. This essentially helps preventing the formation of pleats during lamination. If the desirable stretching temperature is lower than the temperature necessary for sticking the films together, the first e.g. 10-20% of the stretching can take place at a higher temperature without any noticable harm.

In order to facilitate the uniting in connection with the method of claim 5, a lower melting adhesive polymer may be coextruded on at least one surface of at least one layer as said in claim 12.

This can be carried out as described in claim 13, with the practical advantage of avoiding controlled heating means, whereby the apparatus becomes particularly cheaper. In this connection, it has been found that the simultaneous stretching of two films while they are pressed together—particularly as in the embodiment of claim 19, to be described below—has a surprisingly high tendency to cold-weld the films together, so that only a small degree of stickyness is required. E.g. surface layers of polyethylene with 16% vinylacetat copolymerized have been found to weld at room temperature in this manner, yielding a peel-strength of 10 gr per cm. The bonding strength can subsequently be increased by passage over or between heated rollers.

The adhesive polymer may be coextruded in stripes as said in claim 14. It is hereby possible to expendiently obtain the stong-bond/weak-bond or strong-bond/no-bond pattern explained in connection with claim 2.

Another method of expediently obtaining a bonding pattern of the said kind consists in coextruding on one of adjacent surfaces of two layers a continuous ply of an adhesive polymer, and further to provide stripewise or spotwise the other of said surfaces with a release layer, as mentioned in claim 15.

Still another method to obtain the said kind of bonding pattern is to coextrude the adhesive polymer as described in claim 16. By this feature the zones of no-bond form a dotted configuration.

A very important embodiment of the method according to the invention is described in claim 17. As previously mentioned, the stretching process is preferably carried out at a relatively low temperature, e.g. room temperature, and use as normally of a tenter frame under those circumstances will almost inevitably give an uneven "necking-down" with a laterally varied tear-propagation strength.

It is known to produce lateral stretching under even application of the stretching forces, see French Pat. No. 1.331.095 and British Pat. No. 1.078.732. Both make use of 2 rubber conveyor belts which are expanded laterally at the same time as they are firmly pressed together, thereby gripping and drawing the film. However, for use in the present invention the simpler method of claim 18 has proven more convenient. In this connection it should be noted that a strictly even distribution of the stretching forces are not necessary, but—on the contrary—a certain uneveness on a fine scale will be advantageous as far as tear propagation strength is concerned. It has in particular been found advantageous for the tear propagation strength to let the state of orientation vary according to a pattern of striations—see FIGS. 8 and 9—in such manner that in one set of striations the biaxial orientation is unbalanced and is strongest parallely or nearly parallely to the striations, while in the intervening striations it is also unbalanced but is strongest perpendicularly or nearly perpendicularly to the striations. In order to obtain this pattern, the stretching method of claim 18 can with advantage be carried out as specified in claim 19.

When especially high tear propagation and puncture resistance is desirable, and relatively low yield point is allowable, the stretching is carried out as further specified in claim 19. There is hereby obtained a higher elongation at break. In order to allow the contraction at the same time as the longitudinal stretching is carried out in a narrow zone, the laminate is preferably supplied with very fine, longitudinal pleats—in anology to what is disclosed in U.S. Pat. No. 33,233,029. In this connection, a suitable result is usually obtained when the fine pleats formed by the last step of the lateral stretching method of claim 19 are maintained in the sheet when the latter is fed into the longitudinal stretching zone.

Although it is stated above that there are advantages in producing a striated pattern of orientation and thickness variations, especially with a view to the tear propagation resistance, this effect should normally not be exagerated since this would have an adverse effect as well on printability as on the puncture resistance against sharp items.

The object of claim 19 therefore is to avoid an exagerated tendency to sharp formation of the lineary stretching zones, which usually would occur if the sheet were longitudinally oriented in any significant degree.

With regard to the attenuation and the uniting of the layers, another preferred embodiment of the invention is described in claim 22. Hereby one looses some of the advantages achieved by the method according to claim 5—since it is hereby impossible to obtain truely uniaxial directions of grain—but gaines the advantages of operational sort to handle only one common sheet outside the extrusion die.

It is simple to construct the extrusion die-parts for extruding three or more layers, which as previously mentioned has several advantages.

It is preferable in addition to the features according to claim 22 to coextrude a polymer for controlling the adhesive strength as said in claim 23.

Due to the fibrous morphology, the stretching process will normally produce internal but usually not trespassing voids in the grainy layers. This effect is particularly significant when the stretching takes place at a relatively low temperature, and more or less opaquenes is produced hereby. This effect can be utilized to substitute white pigmentation, but can also be abolished by subsequent pressure rolling as specified in claim 24.

The invention will now be described in more detail with reference to the drawings, of which FIG. 1 shows a section through an extrusion-die for manufacturing of a sheet material according to the invention.

FIG. 2 in perspective view with displaced sections shows the principle of an extrusion die with two counter-rotating exit slots and means to extrude two layers through each slot.

FIG. 3 in similar view shows the principle of an extrusion die with two counterrotating and one fixed slot and with interjacent exit slots for air streams.

FIG. 4 in perspective view and partly in section shows the principle of a rotating, ringformed extrusion die with a mandrel extending through its centre.

Figure 1:
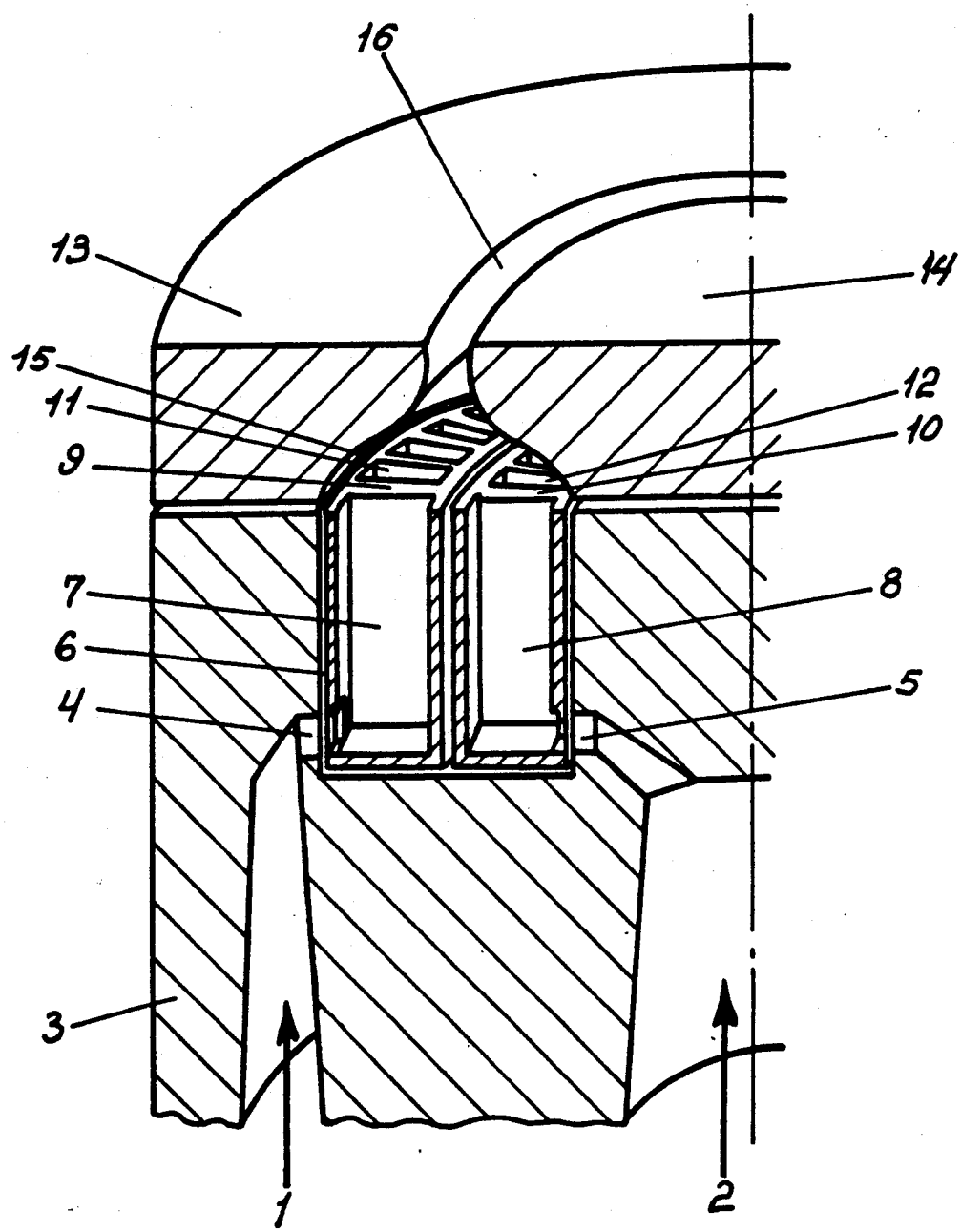

The extrusion die shown in FIG. 1 is an example of how to carry out the method, in which two polymer-in-polymer dispersions are extruded into a common collecting chamber through two rows of partitions, which are rotating in opposite directions. The two dispersion streams 1 and 2 are fed through inlet channels in the lower part of the die to annular channels 4 and 5 respectively in the two walls in the track 6, in which the two rings 7 and 8 are moved in opposite directions by driving means, e.g. by teeth and toothed wheels (not shown). The two rings 7 and 8 are supplied with rows of partitions 9 and 10 respectively, by which two rows of openings 11 and 12 are formed, through which the two dispersions are extruded into the collecting chamber 15, formed by the two parts 13 and 14, and terminating in the exit slot 16. For the sake of simplicity the partitions 9 and 10 are shown radially extending, but in real fact they are placed at an angle to the radial direction to prevent the formation of die-lines in the extruded sheet. By the extrusion through the two rotating rings 7 and 8 the two dispersions will each become attenuated and will hereby acquire a fibrillar morphology. The two arrays of attenuated streams will thereafter unite in the collecting chamber 15 and form a laminate with criss crossing fibrous morphology. The thickness of this laminate is reduced by the passage through the exit slot 16 and further by a normal draw-down and blow process. Hereafter the film is stretching both in the longitudinal and the transverse direction at a relatively low temperature. Due to the two different fiber directions the two half-pants of the film will exhibit tendencies to split in different directions during tearing. The materials, from which the two half-parts are formed, are so selected that they adhere poorly to each other.

The material will thereby delaminate in a small area around the incission, from which tearing takes place, and this will smooth out the notch effect.

The die shown in FIG. 2 consists of four main parts, viz. a fixed inlet part (17) for circular distribution of the polymers as explained below, a fixed bearing part (18), and supported by the two rotating parts (19) and (20) which form one exit orifice (21). The polymers (A) and (B) are fed to the inlet part (17) where they are distributed in concentrical circular streams. (A) is extruded through the annular conduits (22) and (23), for which either one or two extruders may be used. (B) is extruded through the annular conduit (24). For even distribution, (22), (23) and (24) are supplied with distribution baffles or other distribution means (not shown).

For the sake of clarity, the bearings and sealings between the bearing part (18), the rotating part (19), and the rotating part (20), are not shown, neither are the drives for (19) and (20).

From the three annular conduits (22), (23) and (24) the polymer streams pass the bearing part (18) through three circular arrays of channels (25), (26) and (27), each communicating with an annular chamber (28), (29) and (30) respectively.

The two rotating parts (19) and (20) are preferably rotated at almost equal velocity, but in different directions, as indicated by the arrows (31) and (32). Each rotary part in itself is a coextrusion die for two layers, one consisting of (A) and one of (B). For the sake of clarity, reference FIGS. for explanation of the flow are shown only on part (20), but the flow through part (19) is similar. From the chamber (29) polymer (A) passes into the rotating part through channels (33), while polymer (B) from chamber (30) passes into the rotating part through channels (34). Inside the rotating part are two annular conduits (35) and (36) in communication with, respectively the channels (33) and (34), and separated from each other by a thin circular wall (37).

Having passed the edge of the wall (37), (A) and (B) merge together in an annular collecting chamber (38), which terminates in the exit orifice (21). By the passage through the collecting chamber (38) and into the exit orifice (21), the thickness of the fluid sheet is strongly reduced whereby the material is attenuated.

The partitions between adjacent channels (33) and (34) respectively ought to be streamlined, as shown. For the sake of clarity they extend radially in the drawing, but in real fact they should be forming an angle with this direction to reduce the tendency of the forming of die-lines.

"Polymer A" is a blend of two incompatible or semi-compatible polymers, while "Polymer B" is adapted to give the sheet a suitably tendency to delaminate. It may therefore, e.g. consist of an elastomer which is a poor adhesive for the two layers of A, and may be extruded in stripes. However, if the channels 22 and 23 are fed with two different polymer blends, that are mutual incompatible, the polymer B may be an adhesive with a relative strong bond to the two polymer blends, and it must in that case be extruded in stripes or otherwise interrupted.

Figure 3:
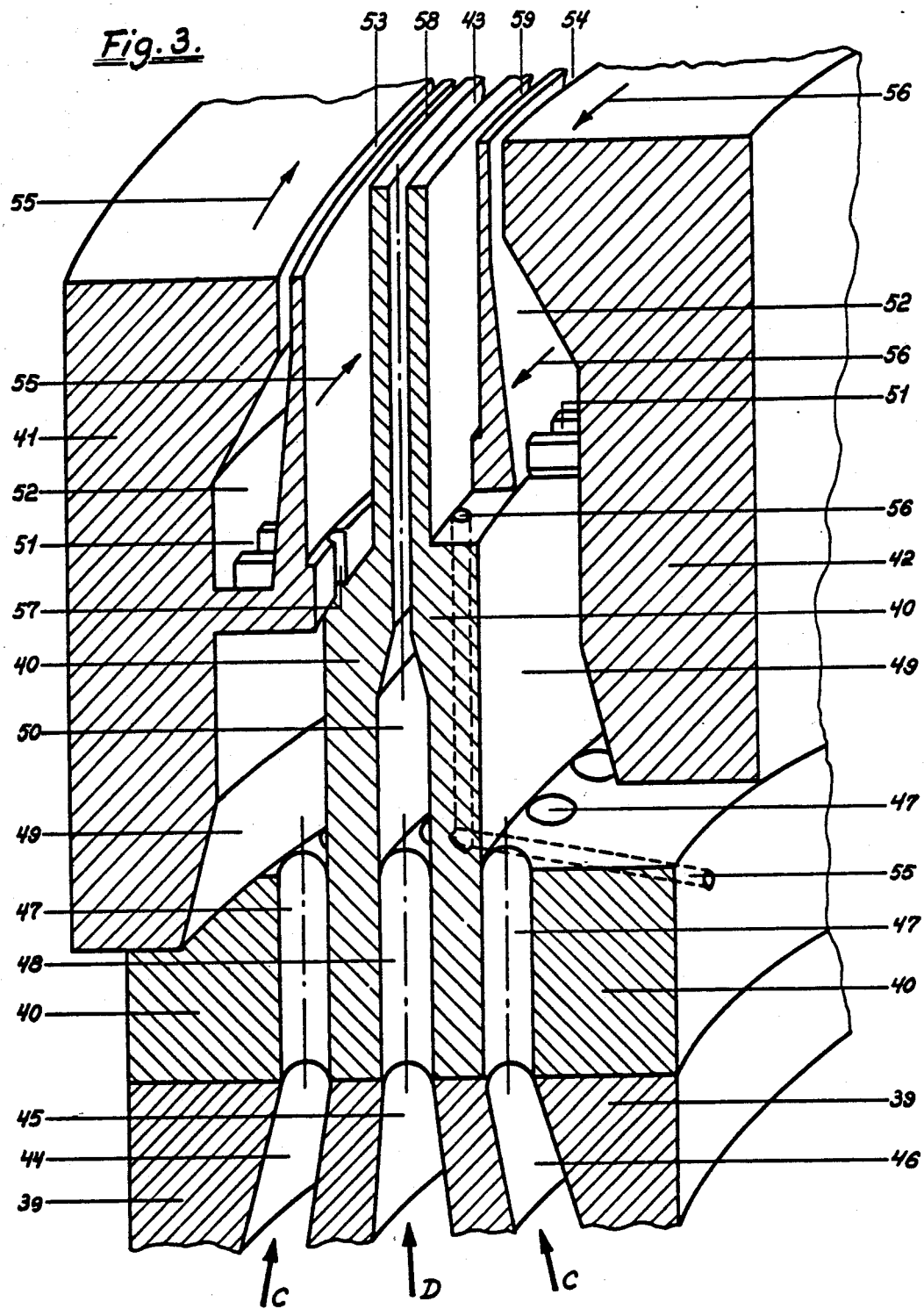

The device shown in FIG. 3 consists of essentially similar main parts (39), (40), (41) and (42), but there is one exit slot (53) and (54) respectively in each of the rotating parts (41) and (42), and there is further a fixed exit slot (43) which is formed by the bearing part (40). From the three sets of annular conduits (44), (45) and (46) the polymer streams (C) and (D) pass the bearing part (40) through channels (47) and (48), respectively, and into the three annular chambers (49) and (50), of which the latter continues in the fixed exit slot (43). Each of the chambers (49) is formed of a fixed part (40) and a rotating part (41) or (42). Through channels (51) in (41) and (42) each of the chambers (49) communicate with the corresponding one of the two annular chambers (52) in the rotating parts, and each chamber (52) terminates in an exit slot (53) and (54), respectively.

Arrows (55) and (56) show the direction of rotations.

Having left the die, the three tubular films are fused together at the same time as the two films formed of (C) are subjected to torsion due to the rotations of (41) and (42).

From the outside and inside of the part (40), air is led through channels (55) ending in orifices (56). For the sake of clarity, the channels (55) from the outside of the part (40) are not shown. Through other channels (57) in the parts (41) and (42), the air is led through exit slots (58) and (59) between the fixed part (40) and the rotating parts (41) and (42) respectively. The channels (57) in the part (42) are not shown, for the sake of clarity. The ringformed pockets of air thus created between adjacent layers, prevent the rotating outer and inner polymer films to pleat against the midlayer immediately outside the exit slots.

Preferably the extruded film is blown, and both internal and external air-cooling is applied.

Figure 2:
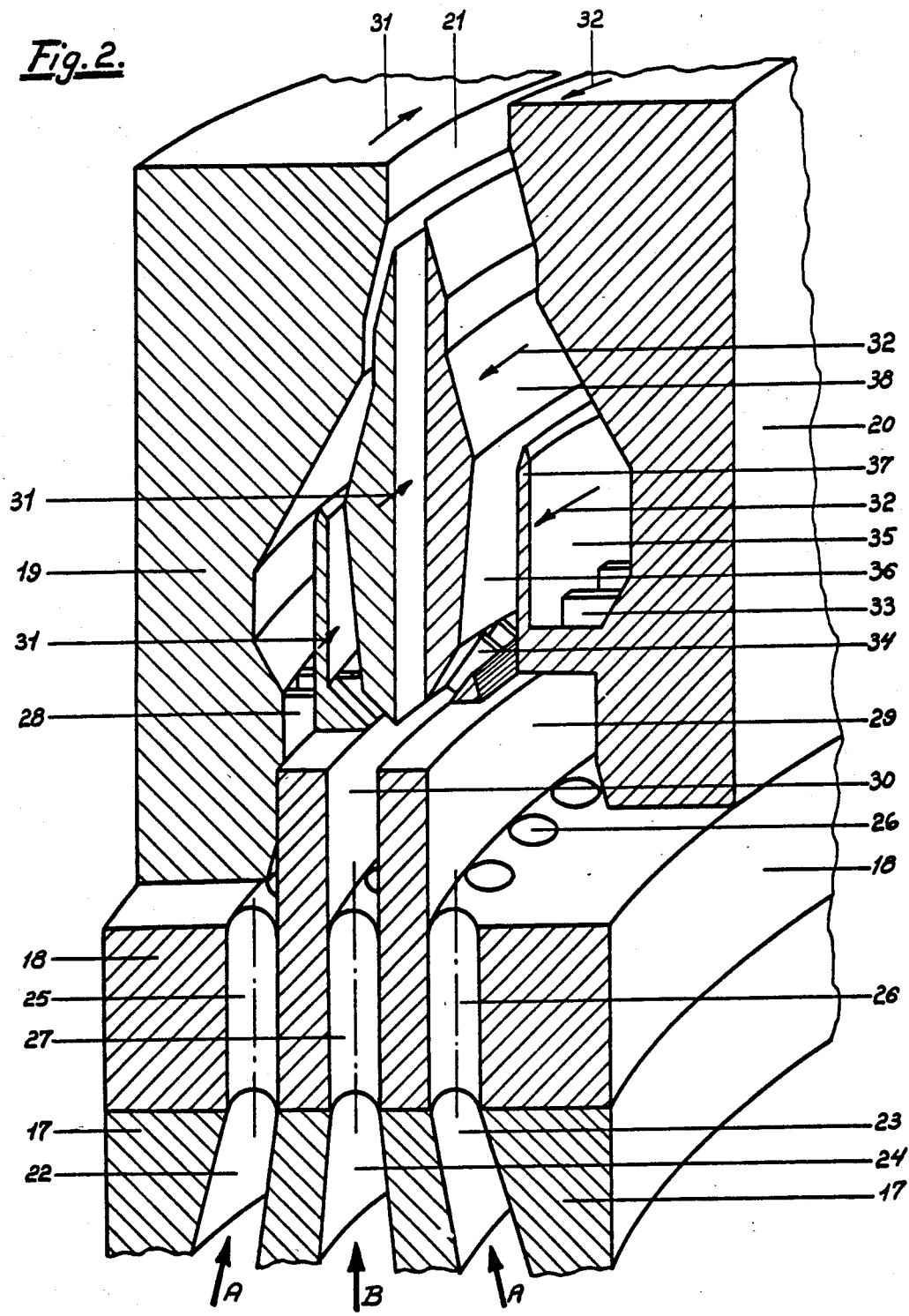

The arrangement shown in FIG. 2 is usually simpler to operate than that shown in FIG. 3, while the latter offers some special possibilities. One is to use expanded polymer for the middle layer, and another is to achieve a longitudinal grain in this layer, so that there will be 3 grains in the sheet. The presence of 3 instead of 2 directions in connection with the preferable tendency to delaminate, will significantly increase the tear propagation strength. Besides the attenuation process is more definitely finished before the lamination, which as previously mentioned is advantageous.

Figure 4:
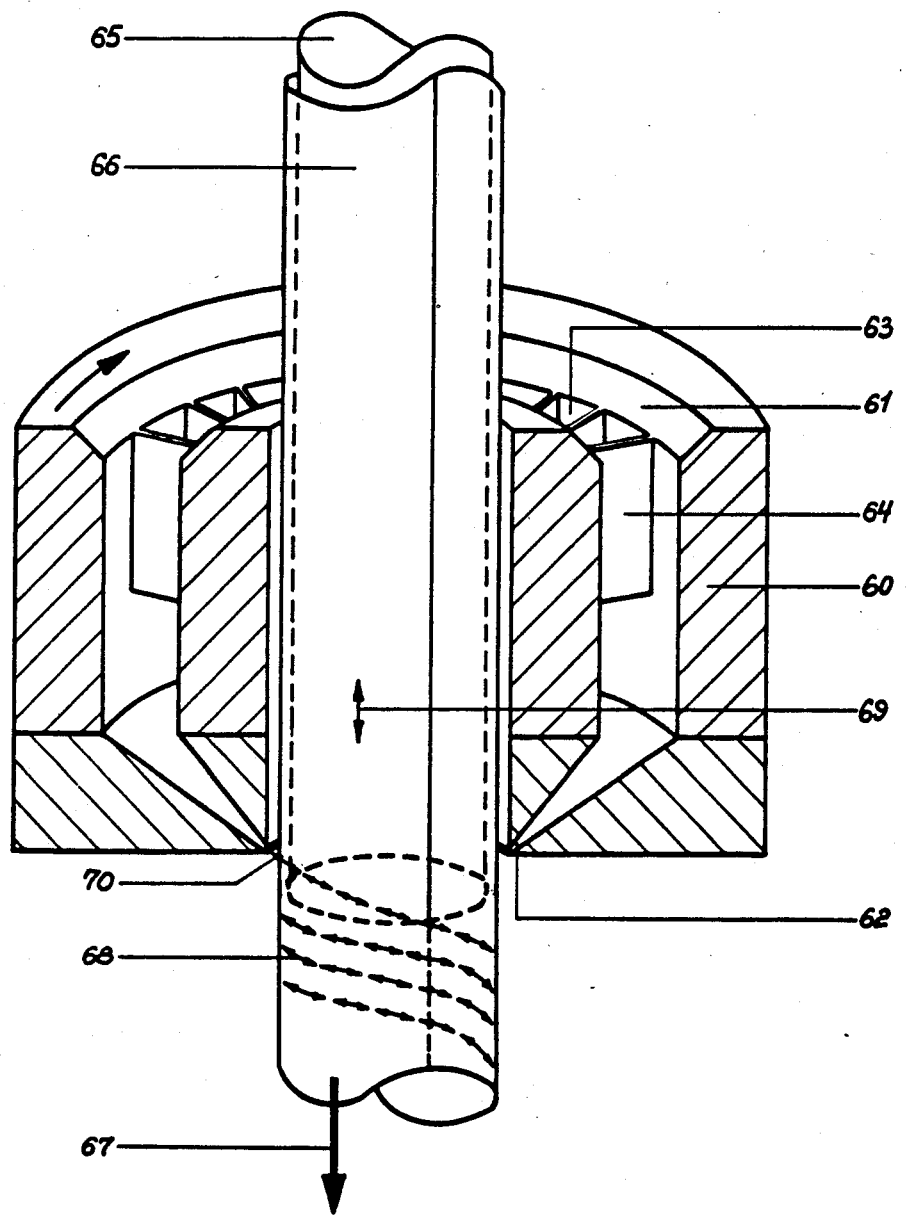

In FIG. 4, (60) is a rotating ringformed extrusion die. Through a fixed part of the extruder-die (not shown), which is in sealed connection with the rotating part (60), a polymer blend is fed into a circular groove (61) and led to the exit slot (62) through channels (63), that are separated by thin, plateformed partitions (64). For the sake of clarity the partitions (64) are shown radially extending, but they are in real fact forming an angle with radial plans to avoid die-lines in the resultant sheet. (65) is a mandrel that is fixed by means, not shown, and (66) is a longitudinally attenuated preproduced flat sheet, folded to a tubular shape around the mandrel (65). For the sake of clarity a space is shown between the mandrel (65) and the folded sheet (66), but naturally the sheet is lying tight towards the mandrel. The sheet (66) is pulled through the extrusion die over the mandrel as indicated by the arrow (67). When the polymer film (70) still fluid leaves the rotating exit slot (62) it is caught by the folded sheet (66) because of the elastic retention in the attenuated polymer blend, and thus wound around said folded sheet and forewarded along with it, obtaining a helically running direction of splitability indicated by the arrows (68).

The direction of splitability in the preformed, folded sheet (66) is indicated by the arrows (69).

The bonding strength may be controlled e.g. by coextruding an adhesive layer with the film (66). With a sufficiently high temperature of the mandrel (65), the lamination of the sheet may be effectuated on this. However, often the film (70) is preferably chock-cooled on the mandrel, in which case the temperature of the mandrel may be insufficient for the welding of the two films (66) and (70) together. The lamination may therefore be completed by hot- or coldwelding after the films have left the mandrel (65).

With the words "machine direction", which is used earlier in the description with regard to claim 5 is ment the forewarding direction of the sheet (66).

Figure 5:
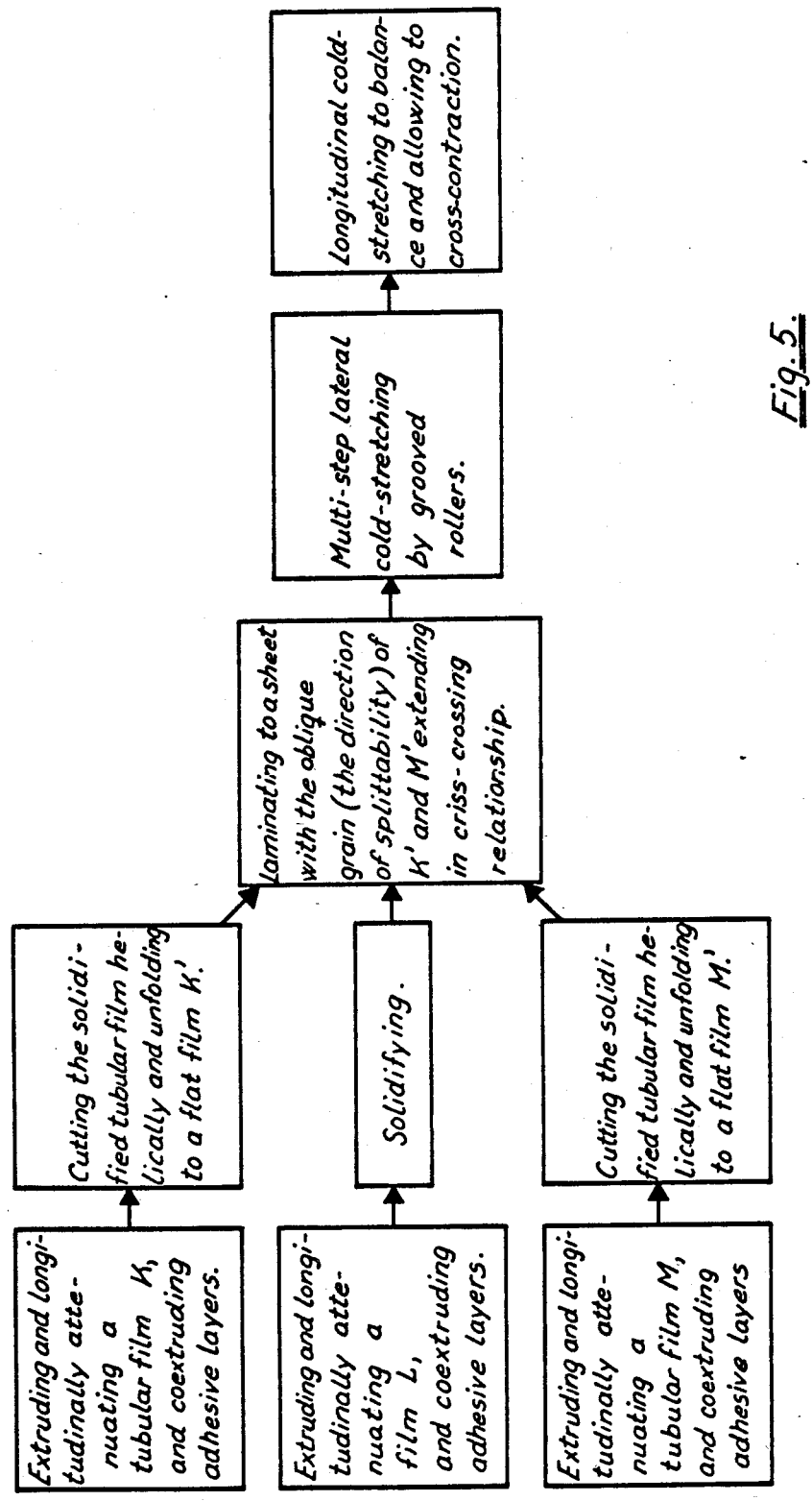
FIG. 5 is a flow-sheet of the process regarding a preferred embodiment of the method according to the invention.

The flow-sheet of FIG. 5 schematically mentions the different steps of a preferred method in which the use of rotating die-parts are avoided. The last two steps can be carried out by the cold-stretching method indicated by the process-line of FIG. 6, in which section "Q" is the cross-stretching line and section "R" is the longitudinal stretching line. The system of rollers in section "Q" consists of driven nip-rollers (71), driven grooved rollers (72), idle rollers (73) and banana rollers (74). The banana rollers (74) after each step serve to draw out the pleates produced by the lateral stretching. Over the idle roller (75), the film (79) enters section "R", the longitudinal stretching line, where it is drawn through a water bath (76) serving to abolish the stretching heat and maintain a suitable stretching temperature e.g. at 20°–40° C. onto a bobbin (77).

The arrow (78) indicates the machine direction.

Figure 7:
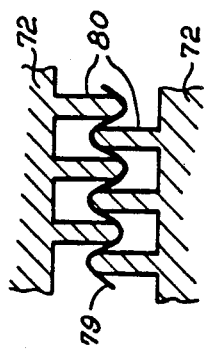
FIG. 7 is a detail of the "grooved rollers" which perform the lateral stretching in uneven zones, called "striations".

In FIG. 7 a pair of driven grooved rollers (72) are shown in detail with the film (79) pressed and stretched between the teeth (80) of the rollers (72).

Figure 6:
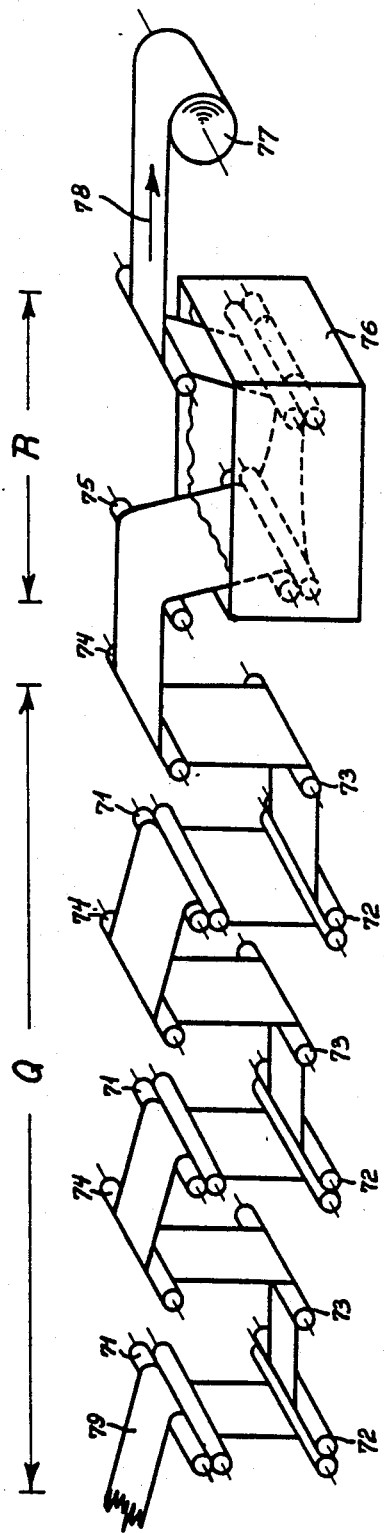
FIG. 6 is a process-line of a preferred cold stretching method.
Figure 8:
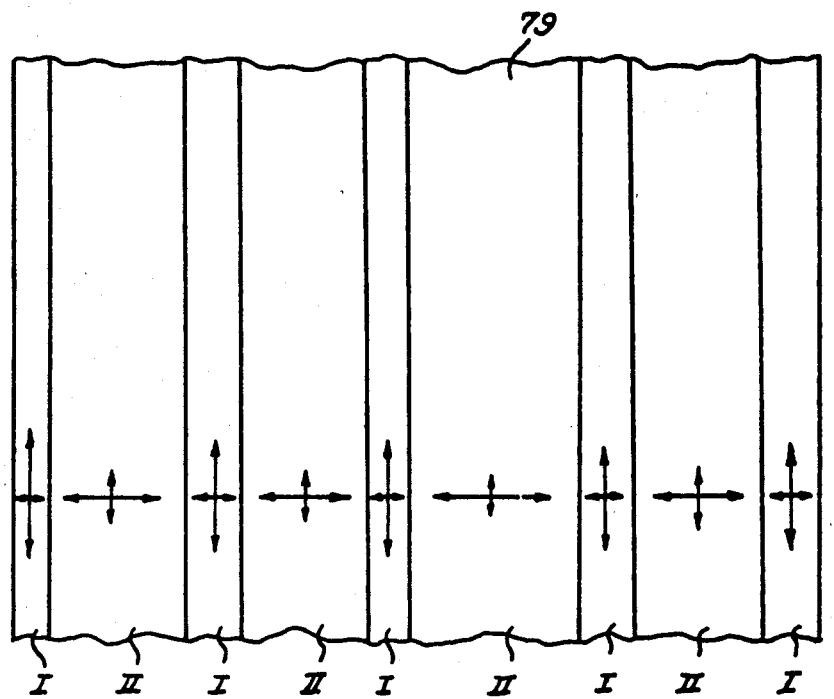
FIG. 8 is a schematical schetch, on an enlarged scale, of the pattern of the striations and the orientation therein, of a film cross-stretched according to the process-line of FIG. 6.

In FIG. 8 the relative lengths of the arrows in the striations I and II of the film (79) indicate the relative amounts of orientation achieved by the biaxially stretching method shown in FIG. 6 and FIG. 7.

Figure 9:
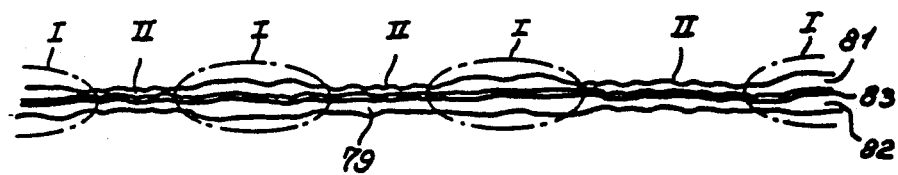
FIG. 9 is an enlarged cross-section of the film of the FIG. 8 as actually found by microscopy, however for the sake of clarity, the thickness is shown on a scale twice that of the width.

In FIG. 8 as well as in FIG. 9 the numbers I and II indicates the striations, which generally have varying width and uneven character. Furthermore it should be noted, that the outer layers (81) and (82) of the film (79) are not always symmetrical with respect to the thin midlayer (83). This assymmetry further serves to make a tear "fork".

For economical reasons, the present invention is particularly useful in connection with blends which mainly contain crystalline polyolefins. Best are for the most common application blends of polypropylene and high- or low-density-polyethylene. What blending ratio should be applied, and whether high- and low-density polyethylene should be used depends on the desired stiffness, low temperature strength, and in general on which strength properties are particularly wanted. In order to obtain a sufficient cohesive strength in each layer, the polypropylene should either be a copolymer semi-compatible with polyethylene, e.g. polypropylene with 2–5% contents of ethylene, or there should be used a suitable "alloying agent". In this connection it is sufficient to maintain high contents of the atactic modification in the iso-(syndio-) tactic polypropylene during manufacture of this polymer instead of removing this "impurity", as normally done. It is a special object of the invention that polypropylene with high contents of the atactic material can be made highly useful. Other "alloying agents" have been mentioned earlier in the specification.

Economically interesting are also blends of polypropylene and an elastomer —e.g. ethylen-propylene-rubber, ethylene-vinylacetat copolymer, polyisobutylene or a "thermoplastic rubber" based on butadiene/styrene.

When particularly high low-temperature resistance and/or high flexibility is desired, blends of low-density polyethylene and a semi-compatible rubber is preferable. It will be understood that the blend needs not be formed by mechanical blending, but can be formed already in the polymerization process. Thus, polypropylene with extreme high contents of the atectic component can be useful without any further admixture, and the known polymerization processes which aim at making blends of polypropylene, polyethylene, and block polymers herebetween, can also be adapted.

Considering polymers outside the polyolefin groups, the following combinations for example will be useful for special purposes: (a) Polyester/polyamid or polyuretan, (b) polyester or polyamid/polycarbonate, (c) Vinylidene-copolymers in different combinations.

In addition to the layers with the special morphology as described, there may also be layers with special properties. Thus, it is almost always advantageous to coextrude thin surface layers of a suitable adhesive component in order to enable sealing of the laminate without ruining of the orientation. As another example it will also often be necessary or advantageous, especially for food packaging, to add one more special layers to improve barrier properties.

As understood in the art, see especially the text *Handbook of Package Engineering* by Hanlon, McGraw-Hill Book Co., copyright 1971, page 13–10 and through page 13–16 and page 3–7, the term "barrier properties" refers to the relative impermeability, i.e., low transmissivity, of a film layer with respect to moisture and gases, particularly oxygen. Film layers recognized in the art as having barrier properties include those formed of copolymers of vinyl chloride and vinylidene chloride, e.g., as sold under the trade name "Saran", of fluorocarbon polmers, e.g., as sold under the trade name "Aclar", high density propylene, cellophane and metal foil, e.g., aluminum foil. Laminates including such film layers are known to be well suited for the packaging of food products such as meat, cheese and the like needing protection from moisture, etc.

The high-strength laminate according to the invention is believed to be advantageous for use within the following fields:

(1) Food packaging: Heavy duty food bags in general, 100% plastics or combined with paper. Frozen food packaging.

(2) Non-food packaging: Fertilizer bags, cement bags, bags for valuable chemicals, e.g. plastic granules, bags for coarse chemicals (e.g. rock salt, rock pieces) and for other sharp items, wrapping of steel plates, packaging of carpets, baling-wrap, e.g. of cotton, wool, lumber wrap, grocery bags, individual packaging of machine-parts, weapons, etc., sterilization-bags for heavy or sharp objects, miscellaneous: e.g. for textile apparel, apper, drugs, soaps, toiletries, tobacco.

(3) Film in connection with containers: Shrink wrap and stretch wrap for pallets, trash bags, in particular compactor bags, industrial shipping packs.

(4) Non-packaging: Fumigating film, earth cover for erosion control, lining in ponds, water reservoirs and channel construction, road underlay, wind screens, green house film, plant-protection film (agricultural and horticultural), cover over dumps of agricultural and horticultural products, salt etc., weathering protection of animals (animal "coats"), raincoats, tents, inflatable architectural structures, water inflated structures, lighter-than-air-buoyant structures, rib-constructions (architectural, cheap vessels), cusion-pillows as fillers in cargos, railroad car liners, truck covers, weathering protection over buildings under construction, water barrier over cement constructions to retard drying, insulation of roof under shingles, insulation of refrigeration rooms, "membrane-films" in house construction, ceiling tile, misc. building papers (in lamination with paper) cheap swimming-pool constructions, industrial tapes.

It will be understood, that the above described new extrusion methods and apparatus which make use of rotating die parts, will also have certain useful applications outside the field defined by claim 1. Thus, they can be used to extrude and laminate film without a "grain" as described, which still are applicable with advantage for certain purposes. Further, the general extrusion system shown in FIG. 4 and claimed in claim 6 can e.g. be used to spin a melt-oriented film (with or without a grain as described) around a cold-stretched film.

EXAMPLE 1

A three layers tubular film is extruded in the following composition:

Middle layer (70% of total)
85% isotactic polypropylene of gas-phase type ("Novolen") with high atactic contents
15% ethylene-vinylacetat copolymer (16% vinylacetat).

Both surface layers (one 10% of total, the other one 20% of total):
Ethylene-vinylacete copolymer (16% Vinylacetate—to serve as adhesive layers.

The polypropylene has melt index 0.3-0.6 according to ASTM D 12 38 condition L, while the ethylene-vinylacetate copolymer has melt index 2.5 according to the same ASTM but condition E. The tubular film is extruded from a 1 mm wide slot at 180° C.-230° C. and drawn to 0.130 mm in molten state. The blow ratio is kept very low, viz. 1.2:1. Thereafter it is cut helically to a flat film with 45° angle of "grain". Two such helically cut films, with their "grain" perpendicular to each other, and the thinner surface layers facing each other, are fed together at 20° C. through 7 sets of "grooved rollers" - see FIG. 6 and 7. The width of each groove is 1 mm and the width of each ridge is 0.5 mm. The intermeshing of the ridges with each other (difference of level between the tops) is 2 mm. Between each passage through a set of "grooved rollers" the pleats formed in the laminate are straightened out. By the mechanical work between the "grooved rollers", and due to the copolymer layers which act as adhesive, the two films are hereby cold-welded together with relatively low bonding strength,—peel strength measured to 10 gr per cm—and is at the same time cross-drawn. After the 7 passages at 20° C. the film is passed once through a similar set of "grooved rollers" with the same dimensions and intermeshing, but heated to 120° C., whereby there is formed lines of strong bonding. Finally the laminate is longitudinally oriented in three steps with about 1 cm stretching-gab (so as to minimize the cross-contraction). The last stretching is so adjusted that the total lateral cold-stretch-ratio and the total longitudinal cold-stretch-ratio are equal, whereby the product hereof i.e. the area-stretch-ratio is 2.4:1.

Test results compared to a heavy-duty bag quality low-density polyethylene film of 85% higher sq.m weight and melt index 0.3 according to same ASTM condition E. Gauge 100 gr per sq.m for the laminate and 185 gr per sq.m for the polyethylene film. Impact strength measured by falling-ball (diameter: 61 mm, weight 320 gr) for the laminated film of 100 gr per sq.m: 5.5 m.

For the polyethylene film of 180 gr per sq.m: 2.0 m

Tongue tear resistance:
Tearing at velocity 100 mm per min, total specimen width 5 cm, incission length 10 cm:
For the laminated film of 100 gr per sq.m: 5.9 kg in the machine direction. and 6.8 kg in the transverse direction.
For the polyethylene film of 180 gr per sq.m: 1.3 gr.
Elmendorf tear resistance (shock-tearing):
The test is a modification of standards aiming at a more symmetrical tearing. Results:
For the laminated film of 100 gr per sq.m: in longitudinal direction 441 kg cm per sq.cm, in cross-direction 344 kg cm per sq. cm. For the polypropylene film of 180 gr per sq.m: in longitudinal direction 167 kg cm, per sq.cm in cross-direction 172 kg cm per sq. cm. A piece of the sheet is delaminated by peeling and the structure is examined in microscope. The main layers have a pronounced fibrous morphology with zig-zagging grain-directions.

EXAMPLE 2

The procedure of Example 1 is repeated with the following modifications: The three-layers coextruded film had the following composition:
Middle layer (70% of total):
85% isotactic polypropylene (same type as in ex. 1)
15% ethylene-propylene-rubber (ab. same melt index as the polypropylene)
Both surface layers (each 15% of total)
ethylene-vinylacetat copolymer (same type as in ex. 1)

The film was stronger melt-attenuated after the exit from the die, namely by drawing from 1 mm thickness to 0.065 mm (60 gr per sq.m). Examinations in polorized light showed that the melt-orientation produced hereby corresponded to about 35% uniaxial cold-drawing. After the spiral-cutting, there was produced a 3-ply laminate. The third layer, which was placed in the middle, was with longitudinal "grain direction" obtained by longitudinal cutting of the same film. The lamination and drawing took place on the machinery of ex. 1, but all steps were carried out at 20° C., and the apparatus were adjusted to hereby produce a total area-stretch ratio of 2.5:1 by which the final laminate thickness became 72 gr per sq.m.

The peel strength of the bonding between the layers was measured to 10 gr per cm. Examinations in microscope showed a similar structure as in ex. 1.

The following test results were obtained:

|  |  | Present film 3 layers 72 gr/sq · m | Comparison unoriented LDPE - film 184 gr/sq · m |
| --- | --- | --- | --- |
| Impact Strength | gr | 1000 gr × m | 530 gr × m |
| Tear propagation strength | MD+ | 848 gr × m | 307 gr × m |
| (slow tear) | TD++ | 1120 gr × m | 620 gr × m |
| Load at break | MD | 11.1 kg | 10.6 kg |
| (1" wide samples) | TD | 8.3 kg | 10.7 kg |
| Stretch at break | MD | 286% | 467% |
|  | TD | 347% | 620% |
| Shrinkage |  |  |  |
| 1 min. 130° C. | MD | 28% | — |
|  | TD | 14% | — |
| 1 min. 155° C. | MD | 58% | — |
|  | TD | 41% | — |

+Machine Direction
++Transverse Direction

EXAMPLE 3

A series of sheets on polyolefin basis has been produced by the extrusion die shown in FIG. 2. The diameter of the exit slot (21) of the die was 130 mm and the width of the latter 1 mm. The biggest width of the collecting chamber (38) was 4 mm, which means that the amount of attenuation during the passage through the collecting chamber toward the exit slot has been smaller than preferable. The extrusion temperature was about 240° C.

After the longitudinal cutting of the tubular film, the stretching was first carried out laterally in between 4 and 8 steps and thereafter longitudinally in between 2 and 4 steps in the same machinery as used in Examples 1 and 2.

The composition, flat tube width (measure of blow ratio), stretching temperature, stretch ratio, and results appear from the table below. "Nov" stands for Novolene, a gas-phase polymerized polypropylene with relatively high contents of the atactic modification, "PE" stands for low density polyethylene, "EPR" stands for ethylene-propylene-rubber, "SA 872""7823" and "8623" are different types of polypropylene with minor contents of polymerized ethylene.

The fact that even the best samples of this example generally are inferior to those of Example 1 and 2 are explained by a less uniaxial total melt attenuation. A certain biaxial melt-attenuation is inevitable in this embodiment, since the streams are first united inside the die in criss-crossing relationship, and thereafter further melt-attenuated during the passage through the exit and immediately thereafter. On the other hand, this method is particularly simple to operate.

| | Outer Layer Composition | Middle Layer Composition | Orientation Temp. | % | cm Tube Width | Tongue Tear MD | TD | Dart Impact (ft - lbs) |
|---|---|---|---|---|---|---|---|---|
| 1 | 70% 7823, 20% PE, 10% EPR | PE - 10% | Cold | 100% | 30 | 3.3 | 1.8 | 2.5 |
| 2 | 80% 7823, 20% EPR | PE - 10% | Cold | 100% | 30 | 1.7 | 1.6 | 2.5 |
| 3 | 80% 7823, 20% EPR | PE - 20% | Cold | 100% | 30 | 2.7 | 2.3 | 2.5 |
| 4 | 90% SA872, 30% PE | PE - 10% | Cold | 50% | 30 | 7.1 | 4.6 | 2.0 |
| 5 | " | PE - 10% | Cold | 100% | 30 | 5.7 | 2.1 | 2.5 |
| 6 | " | PE - 10% | Hot | 50% | 30 | 9.0 | 4.5 | 2.0 |
| 7 | " | PE - 10% | Hot | 100% | 30 | 7.5 | 3.0 | 1.5 |
| 8 | " | PE - 10% | Cold | 50% | 45 | 6.6 | 1.4 | 2.0 |
| 9 | " | PE - 10% | Cold | 100% | 45 | 2.6 | 1.4 | 2.0 |
| 10 | " | PE - 10% | Hot | 50% | 45 | 5.8 | 2.4 | 2.0 |
| 11 | " | PE - 10% | Hot | 100% | 45 | 6.4 | 2.3 | 2.2 |
| 12 | 100% SA872 | PE - 10% | Cold | 100% | 30 | 1.2 | 3.3 | 2.5 |
| 13 | " | PE - 10% | Cold | 100% | 30 | 2.0 | 1.1 | 1.5 |
| 14 | " | 50/50 EPR/PE - 10% | Cold | 100% | 30 | 2.1 | 1.5 | 2.5 |
| 15 | " | 50/50 EPR/PE - 10% | Hot | 50% | 30 | 3.1 | 2.1 | 1.5 |
| 16 | " | 50/50 EPR/PE - 10% | Hot | 100% | 30 | 1.4 | 1.4 | 1.5 |
| 17 | " | EPR 10% | Cold | 100% | 30 | 5.6 | 2.8 | 2.0 |
| 18 | 80% 7823, 20% EPR | EPR 10% | Cold | 100% | 30 | 4.4 | 1.9 | 4.0 |
| 19 | 70% 7823, 20% PE, 10% EPR | EPR 10% | Cold | 100% | 30 | 4.5 | 2.9 | 3.0 |
| 20 | 70% SA872, 30% PE | EPR 10% | Cold | 50% | 30 | 6.4 | 3.0 | 1.5 |
| 21 | " | EPR 10% | Cold | 100% | 30 | 3.9 | 2.1 | 3.0 |
| 22 | " | EPR 10% | Hot | 50% | 30 | 4.9 | 3.9 | 1.5 |
| 23 | " | EPR 10% | Hot | 100% | 30 | 5.2 | 3.4 | 2.0 |
| 24 | " | EPR 10% | Cold | 50% | 45 | 6.0 | 5.0 | 1.5 |
| 25 | " | EPR 10% | Cold | 100% | 45 | 5.0 | 3.2 | 3.0 |
| 26 | " | EPR 10% | Hot | 50% | 45 | 5.6 | 3.9 | 1.5 |
| 27 | " | EPR 10% | Hot | 100% | 45 | 5.0 | 5.4 | 3.0 |
| 28 | 85% 8623, 10% PE, 5% EPR | EPR 10% | Cold | 100% | 30 | 0.63 | 0.32 | 2.0 |
| 29 | 90% 8623, 10% EPR | EPR 10% | Cold | 100% | 30 | 0.45 | 0.26 | 2.0 |
| 30 | 100% SA872 | 50/50 - EPR/PE - 20% | Cold | 100% | 30 | 4.4 | 4.3 | 3.0 |
| 31 | 100% SA872 | 50/50 - EPR/PE - 5% | Cold | 100% | 30 | 4.5 | 3.5 | 2.0 |
| 32 | 80% SA872, 10% PE, 10% EPR | 50/50 - EPR/PE - 10% | Cold | 100% | 30 | 3.4 | 6.3 | 3.0 |
| 33 | | | | | | | | |
| 34 | 70% Nov, 30% PE | 50/50 - EPR/PE - 10% | Cold | 100% | 30 | 4.8 | 2.4 | 2.5 |
| 35 | 70% PE, 30% Nov | EPR 10% | Cold | 100% | 30 | 4.9 | 4.2 | 4.0 |

| | Mullen Burst (psi) | Beach Puncture MD | TD | Trapezoidal Tear MD | TD | Elmendorf Tear MD | TD | Basis Weight (g/m²) |
|---|---|---|---|---|---|---|---|---|
| 1 | 20 | 129 | 136 | 6.5 | 7.1 | 500–1400 | 500–1300 | 73.5 |
| 2 | 30 | 242 | 228 | 8.9 | 6.8 | 800– | 500–2500 | 69 |
| 3 | 26 | 295 | 241 | 7.8 | 6.4 | 300–1100 | 300–1000 | 62 |
| 4 | 37 | 86 | 105 | 11.6 | 9.5 | 1200–2400 | 400–2000 | 114 |
| 5 | 27 | 103 | 118 | 11.9 | 7.7 | 400–2000 | 1400–3200 | 73.3 |
| 6 | 35 | 66 | 98 | 10.2 | 11.4 | 100–1900 | 1500–8200 | 103.9 |
| 7 | 30 | 67 | 98 | 13.6 | 12.9 | 500–1500 | 2400–3000 | 86.5 |
| 8 | 20 | 71 | 105 | 8.7 | 8.8 | 100–800 | 1100–2600 | 77 |
| 9 | 19 | 69 | 120 | 7.8 | 5.0 | 200–2900 | 2200–3200 | 63.4 |
| 10 | 25 | 44 | 52 | 7.7 | 8.2 | 300–1100 | 1100–3200 | 77.8 |
| 11 | 20 | 86 | 88 | 9.9 | 8.7 | 900–1900 | 900–3200 | 61.1 |
| 12 | 21 | 113 | 103 | 6.3 | 5.4 | 200–1800 | 600–2200 | 54.6 |
| 13 | 22 | 70 | 68 | 7.9 | 5.8 | 310 | 800–2100 | 79 |
| 14 | 22 | 126 | 140 | 5.3 | 7.4 | 200–3000 | 1500–3200 | 70.4 |

-continued

| | Mullen Burst (psi) | Beach Puncture MD | Beach Puncture TD | Trapezoidal Tear MD | Trapezoidal Tear TD | Elmendorf Tear MD | Elmendorf Tear TD | Basis Weight (g/m$^2$) |
|---|---|---|---|---|---|---|---|---|
| 15 | 26 | 56 | 44 | 9.5 | 8.1 | 300–3200 | 100–300 | 83.7 |
| 16 | 29 | 72 | 64 | 10.7 | 7.8 | 150–2500 | 200–3200 | 71.5 |
| 17 | 29 | 83 | 105 | 9.8 | 8.9 | 700–3200 | 800–2000 | 84.5 |
| 18 | 23 | 327 | 278 | 12.5 | 8.4 | 700–3000 | 1400 | 88.4 |
| 19 | 20 | 212 | 187 | 10.4 | 9.0 | 1000–3200 | 900–1300 | 71.4 |
| 20 | 23 | 93 | 105 | 10.3 | 8.9 | 300–3200 | 1100–3200 | 74.8 |
| 21 | 21 | 100 | 115 | 8.2 | 7.6 | 300–3200 | 700–2100 | 70 |
| 22 | 26 | 55 | 71 | 11.5 | 9.4 | 600–2400 | 1200–2500 | 86.9 |
| 23 | 20 | 110 | 116 | 8.6 | 10.2 | 200–2200 | 700–1600 | 64.8 |
| 24 | 26 | 67 | 149 | 13.2 | 10.1 | 1400–3000 | 800–2000 | 88.7 |
| 25 | 23 | 124 | 145 | 11.5 | 7.9 | 1100–2500 | 1000–2300 | 82.9 |
| 26 | 23 | 120 | 101 | 9.6 | 9.3 | 320–3200 | 1200–3200 | 83 |
| 27 | 21 | 116 | 113 | 5.7 | 8.9 | 640–3200 | 600–2700 | 76 |
| 28 | 20 | 105 | 50 | 2.4 | 1.8 | 350 | 96 | 66.3 |
| 29 | 15 | 66 | 73 | 1.8 | 1.5 | 240 | 96 | 74 |
| 30 | 24 | 99 | 94 | 9.0 | 2.7 | 800–2000 | 2600–3200 | 73.8 |
| 31 | 23 | 74 | 107 | 8.6 | 8.4 | 1400–3000 | 700–2700 | 81.7 |
| 32 | 25 | 110 | 117 | 8.4 | 9.4 | 700–2000 | 2400 | 70.4 |
| 33 | | | | | | | | |
| 34 | 23 | 228 | 194 | 7.0 | 7.9 | | | 6.8 |
| 35 | 23 | 336 | 343 | 8.6 | 6.9 | | | 71.2 |

I claim:

1. A high-strength generally continuous flexible laminate comprised of at least two generally continuous films each being biaxially oriented and generally weakly adhered to at least one other such film in sandwich relation, each such biaxially oriented film being formed by extrusion with coincidental melt attenuation of a blend of at least two polymers which are sufficiently incompatible as to exhibit upon said extrusion an internal microscopic fibrillar morphology in which elongated fibrils are arranged in a generalized grain-like pattern having one predominant grain direction and imparting a corresponding direction of splitability to such film, each such biaxially oriented film having incorporated within said generalized grain pattern a substantially zig-zagging specific grain configuration formed by fibrils exhibiting microscopically visible recurrent deflections generally laterally from said predominant grain direction at intervals therealong, such biaxially oriented films being arranged in the laminate in such manner that the respective directions of splitability for at least two such films intersect each other, said laminate including at least one added layer exhibiting barrier properties.

2. The laminate of claim 1 wherein said special layer exhibiting barrier properties is coextruded with one of said films.

* * * * *